US 10,348,175 B2

(12) United States Patent
Fukuhara et al.

(10) Patent No.: US 10,348,175 B2
(45) Date of Patent: Jul. 9, 2019

(54) ROTOR, MANUFACTURING METHOD OF THE ROTOR, AND DC MOTOR

(71) Applicant: MABUCHI MOTOR CO., LTD., Matsudo, Chiba (JP)

(72) Inventors: Kazuki Fukuhara, Matsudo (JP); Kouichi Hashimoto, Matsudo (JP)

(73) Assignee: MABUCHI MOTOR CO., LTD., Matsudo, Chiba (JP)

( * ) Notice: Subject to any disclaimer, the term of this patent is extended or adjusted under 35 U.S.C. 154(b) by 258 days.

(21) Appl. No.: 15/385,356

(22) Filed: Dec. 20, 2016

(65) Prior Publication Data

US 2017/0187273 A1  Jun. 29, 2017

(30) Foreign Application Priority Data

Dec. 28, 2015  (JP) ................. 2015-256709

(51) Int. Cl.
| | |
|---|---|
| *H02K 23/62* | (2006.01) |
| *H02K 1/17* | (2006.01) |
| *H02K 1/24* | (2006.01) |
| *H02K 13/00* | (2006.01) |
| *H02K 15/02* | (2006.01) |

(Continued)

(52) U.S. Cl.
CPC ............. *H02K 23/62* (2013.01); *H02K 1/17* (2013.01); *H02K 1/24* (2013.01); *H02K 3/527* (2013.01); *H02K 13/006* (2013.01); *H02K 15/0075* (2013.01); *H02K 15/022* (2013.01); *H02K 15/095* (2013.01); *H02K 2203/03* (2013.01)

(58) Field of Classification Search
CPC ............ H02K 23/62; H02K 1/17; H02K 1/24; H02K 3/527; H02K 13/006; H02K 15/0075; H02K 15/022; H02K 15/095; H02K 2203/03; H02K 13/04; H02K 13/08; H02K 13/10; H02K 3/528
USPC ..................................................... 310/177, 71
See application file for complete search history.

(56) References Cited

U.S. PATENT DOCUMENTS

2014/0111040 A1* 4/2014 Badafem ................ H02K 5/148
310/51

FOREIGN PATENT DOCUMENTS

| JP | S54-041502 U | 8/1977 |
|---|---|---|
| JP | S54-041502 U1 * | 8/1977 |

(Continued)

OTHER PUBLICATIONS

Notification of Reasons for Refusal issued by the Japan Patent Office for corresponding Japanese Patent Application No. 2015-256709, dated May 22, 2018, with an English translation.

(Continued)

*Primary Examiner* — Jue Zhang
(74) *Attorney, Agent, or Firm* — Myers Wolin, LLC

(57) ABSTRACT

Provided are a rotor, a manufacturing method of the rotor, and a DC motor including the rotor, the rotor including: a core around which a winding is wound, the core being rotatable integrally with a shaft; a commutator being fixed to the shaft and having a terminal to be connected to one end of the winding; and a conduction plate being externally fitted onto the shaft via an insulator part between the terminal of the commutator and the core, the conduction plate having a connection part to be connected to the other end of the winding, wherein an axial direction position of the connection part is set in an intermediate portion that is between a winding projection of the winding and the terminal.

9 Claims, 7 Drawing Sheets

(51) Int. Cl.
    *H02K 15/095*    (2006.01)
    *H02K 3/52*      (2006.01)
    *H02K 15/00*     (2006.01)

(56) References Cited

FOREIGN PATENT DOCUMENTS

| JP | S52-116213 A | 9/1977 |
| JP | 63-156563    | 10/1988 |
| JP | H11-215785 A | 8/1999 |

OTHER PUBLICATIONS

The First Office Action issued by the China National Intellectual Property Administration for corresponding Chinese Patent Application No. 201611221860.3, dated Jan. 18, 2019, with an English translation.

* cited by examiner

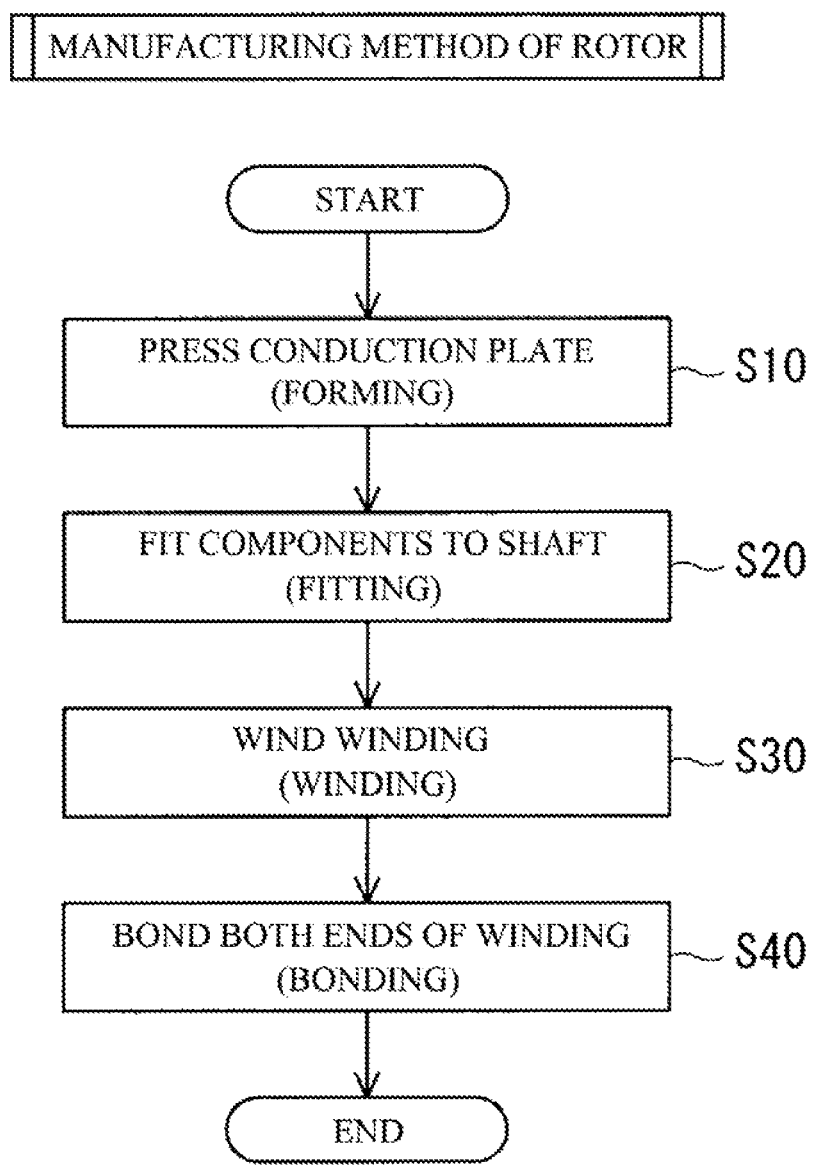

ROTOR, MANUFACTURING METHOD OF THE ROTOR, AND DC MOTOR

CROSS-REFERENCE TO RELATED APPLICATION

This application is based upon and claims the benefit of priority of the prior Japanese Patent application No. 2015-256709, filed on Dec. 28, 2015, the entire contents of which are incorporated herein by reference.

BACKGROUND

1. Technical Field

The present disclosure relates to a rotor, a manufacturing method of the rotor, and a DC motor (direct current motor) including the rotor.

2. Description of the Related Art

Traditionally, various devices such as automotive electrical components and office equipment employ a permanent-magnet DC motor as a motor serving as a power source. The permanent-magnet DC motor includes a stator onto which a permanent magnet is fixed and a rotor supported by a shaft rotatably relative to the stator. In this motor, the rotor is rotated by switching a direction of an electric current flowing through a winding wound around the rotor. Examples of a winding method (circuit structure) of the winding encompass a Y-connection method (Y-connected circuit) and a delta connection method (delta-connected circuit). In the Y-connection method, a resistance becomes higher than in the delta connection method. Therefore, a configuration employing a rotor of the Y-connection method consumes less electric current than a configuration employing a rotor of the delta connection method. Therefore, some DC motors to be integrated into battery-driven devices employ the rotor including the Y-connected winding (the rotor of the Y-connection method).

The rotor of the Y-connection method has an electrical neural point. The electrical neural point is formed by, for example, twisting together ends of the winding wound around a core and connecting the ends to each other by soldering or the like. Alternatively, the electrical neural point may be formed by connecting, to a metallic part (hereinafter, referred to as a "conduction plate"), an end of a winding wound around a core by, e.g., welding or soldering (see JP-A-63-156563). Note that some rotors of the delta connection method may also include the conduction plate.

SUMMARY

However, in a rotor including a conduction plate (e.g., a rotor including a conduction plate in which an electrical neural point is to be formed), a distance is short between a winding wound around a core and a connection part of the conduction plate to which an end of the winding is to be connected. Due to this, heat generated in bonding of the end of the winding to the conduction plate may be transmitted to the winding. As another disadvantage, the shorter this distance is, the more difficult it is to perform connection work for connecting the end of the winding to the conduction plate. Further, the above distance is shorter in a motor having a smaller size. Therefore, with the motor having a smaller size, the connection work is more difficult. Further, with such a motor, a larger amount of heat generated during the bonding is transmitted to the winding, so that a greater thermal effect is given to the winding.

The present disclosure was made in order to solve the above problems. One object of the present disclosure is to provide a rotor configured such that heat transmission during bonding between an end of a winding and a conduction plate is reduced or suppressed and workability is improved, a manufacturing method of the rotor, and a DC motor including the rotor. Note that the present disclosure is not limited to this object, but the present disclosure also has another object to bring about effects that are given by configurations and arrangements shown in the later-described embodiments of the present disclosure and that cannot be attained by related techniques.

(1) A rotor disclosed herein includes: a core around which a winding is wound, the core being rotatable integrally with a shaft; a commutator being fixed to the shaft and having a terminal to be connected to one end of the winding; and a conduction plate being externally fitted onto the shaft via an insulator part between the terminal of the commutator and the core, the conduction plate having at least one connection part to be connected to the other end of the winding, wherein an axial direction position of the at least one connection part is set in an intermediate portion that is between a winding projection of the winding and the terminal.

The winding projection refers to a portion of the winding wound around the core, the portion being protruded from an axial-direction end surface of the core in a mountain shape (i.e., a portion bulged from the end surface). Namely, the connection part is positioned between a tip of the winding projection and the terminal (i.e., in the intermediate portion) viewed in the axial direction.

(2) Preferably, the at least one connection part is positioned in a center region of a region between the winding projection and the terminal viewed in an axial direction of the rotor. The center region refers to, not only a center point of the intermediate portion viewed in the axial direction, but also a certain region including the center point. Namely, the connection part is preferably positioned in the center region, in which a distance between the connection part and the tip of the winding projection is substantially equal to a distance between the connection part and the terminal.

(3) Preferably, the at least one connection part is projected more radially outwardly than an outer periphery of the core. Note that the connection part is preferably positioned such that a tip of the connection part is positioned more radially outwardly than the outer periphery of the core even after thermal bonding such as welding or soldering. However, the connection part is positioned so as not in contact with a housing for accommodating the rotor.

(4) The at least one connection part preferably includes a plurality of connection parts, and the conduction plate preferably includes: a plane which is placed on an end surface of the core via an insulating layer and in which an electrical neural point is to be formed; a plurality of standing walls extended from a radially-outward end of the plane in a direction crossing the plane, the plurality of standing walls defining an axial direction position of the plurality of connection parts; and the plurality of connection parts being radially outwardly projected from extended-direction ends of the respective plurality of standing walls. Note that the conduction plate preferably has an external shape having threefold or more rotational symmetry.

(5) Preferably, the plurality of connection parts are projected outwardly from the respective plurality of standing walls in such a manner that the plurality of connection parts are orthogonal to an axial direction of the shaft with the conduction plate externally fitted onto the shaft.

(6) Preferably, the rotor includes an insulator placed on a surface of the plane, the surface being opposite to another surface of the plane facing the insulating layer, the insulator being extended along inner surfaces of the plurality of standing walls.

(7) A DC motor disclosed herein includes: the rotor described in any one of (1) to (6) above; a stator including a housing having a bottomed tubular shape and a permanent magnet fixed onto an inner surface of the housing, the stator rotatably supporting an end of the shaft of the rotor; and an end bell fixed to an opened part of the housing, the end bell including a brush.

(8) A manufacturing method of a rotor disclosed herein is a manufacturing method of a rotor that includes a core and a commutator each rotatable integrally with a shaft and a conduction plate externally fitted onto the shaft via an insulator part between the core and a terminal of the commutator. The present manufacturing method includes forming, fitting, winding, and bonding.

The forming includes forming the conduction plate including a plane in which an electrical neural point is to be formed, a plurality of standing walls extended from a radially-outward end of the plane in a direction crossing the plane, and connection parts being projected radially outwardly from ends of the respective plurality of standing walls. The fitting includes, after the forming, fitting the core, the conduction plate, and the commutator to the shaft. The winding includes, after the fitting, winding by fastening one end of a winding to the terminal of the commutator, followed by winding the winding around the core and fastening the other end of the winding to one of the connection parts of the conduction plate. In parallel with or after the winding, the bonding includes, bonding the one end and the other end of the winding to the terminal and the one of the connection parts, respectively, by thermal bonding. Further, the forming causes the conduction plate to be formed such that, with the plane of the conduction plate placed on an end surface of the core by the fitting, an axial direction position of the connection parts is set in an intermediate portion that is between a winding projection of the winding and the terminal.

By positioning the connection part of the conduction plate so that the axial direction position of the connection part is in the intermediate portion that is between the winding projection of the winding and the terminal of the commutator, interference between the connection part and a brush is avoided, and the connection part is apart from the winding projection. This reduces or suppresses heat transmission during the bonding by thermal bonding such as welding or soldering. Further, this facilitates work for fastening (hooking) the winding to the connection part and work for bonding by thermal bonding. This leads to reduction or suppression of heat transmission during the bonding of the ends of the winding to the conduction plate, and to improvement of the workability.

BRIEF DESCRIPTION OF DRAWINGS

FIG. 3A shows a core viewed in the axial direction, FIG. 3B shows a conduction plate viewed in the axial direction, and FIG. 3C is a perspective view of a commutator;

FIG. 6A shows the connection part before welding, and FIG. 6B shows the connection part after welding; and FIG. 7 is a flow chart of one example of a manufacturing method of the rotor according to the embodiment.

DESCRIPTION OF EMBODIMENTS

With reference to the drawings, the following describes a rotor according to an embodiment of the present disclosure, a manufacturing method of the rotor, and a DC motor including the rotor. Embodiments in the following description are presented for the purpose of illustration, and do not intend to exclude any variations and techniques not clearly shown in the embodiments. Parts in the embodiments may be varied in many ways within the scope of the present disclosure, may be selected as required, and/or may be used in proper combinations.

1. Configuration

Figure 1:
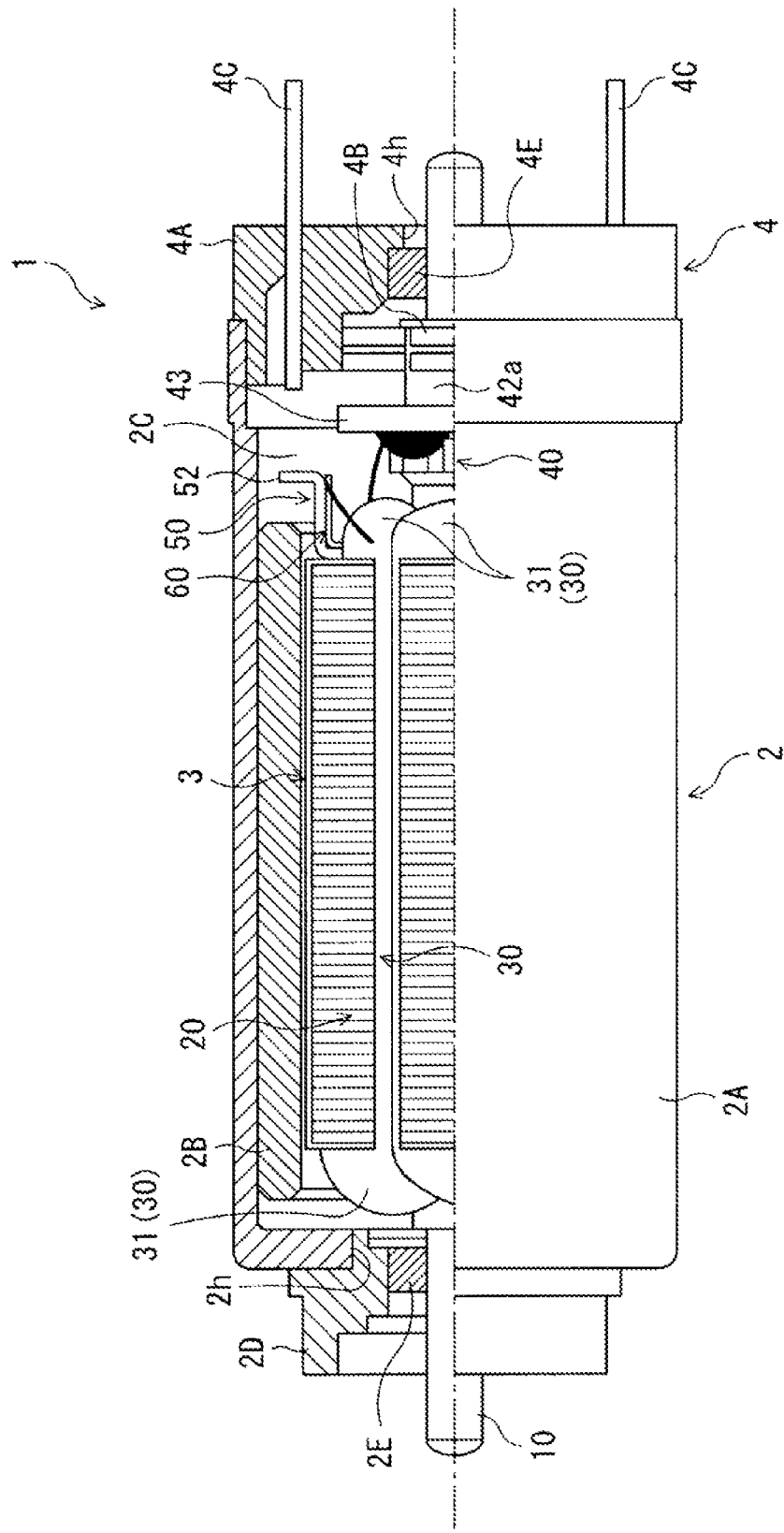
FIG. 1 shows a cross-sectional view of a half part of a DC motor according to an embodiment of the present disclosure, taken along an axial direction of the DC motor.

FIG. 1 is a cross-sectional view of a half part of a DC motor 1 (hereinafter, referred to as a "motor 1") according to the present embodiment, taken along an axial direction of the motor 1. The motor 1 is a permanent-magnet direct current motor with a brush, and includes a stator 2, a rotor 3, and an end bell 4.

The stator 2 includes a housing 2A having a bottomed tubular shape and a permanent magnet 2B fixed onto an inner surface of the housing 2A. In an assembled state of the rotor 3, the permanent magnet 2B faces a core 20 of the rotor 3, and is extended along an axial direction of the rotor 3 in such a manner that the permanent magnet 2B surrounds the core 3. In the present embodiment, one end and the other end of the permanent magnet 2B in the axial direction are positioned so as to extend beyond those of the core 20, respectively. The housing 2A has a space 2C between the end bell 4 and an end surface of the permanent magnet 2B facing the end bell 4. Further, the housing 2A has a substantially circular hole 2h penetrating through a center of the bottom of the housing 2A. Into the hole 2h, a bearing holder 2D is fitted. The bearing holder 2D has a bearing 2E for rotatably supporting an end of a shaft 10 of the rotor 3.

The end bell 4 includes a main body 4A configured to be fixed to an opened part of the housing 2A, a brush 4B supported by the main body 4A, and two terminals 4C configured to supply electric power to the motor 1. The brush 4B is configured to be in sliding contact with a brush contact part 42a of a commutator 40 (described later). Further, the brush 4B is supported by a brush base (not illustrated), and is connected to the terminals 4C. The terminals 4C are fixed to the main body 4A in such a manner that the terminals 4C are projected to the outside of the housing 2A with the end bell 4 of fixed to the housing 2A. The main body 4A has a substantially circular hole 4h penetrating through a center of the main body 4A. Into the hole 4h, a bearing 4E for rotatably supporting the other end of the shaft 10 is fitted.

The rotor 3 includes the core 20 rotatable integrally with the shaft 10, the commutator 40 fixed to the shaft 10, and a conduction plate 50. The shaft 10 is a rotational shaft configured to support the rotor 3, and also serves as an output shaft for externally transmitting an output of the motor 1. The core 20 is a laminated core made of a plurality of laminated steel sheets having an identical shape, and has a center in which the shaft 10 is fixed in such a manner that an axial direction of the shaft 10 coincides with a lamination direction of the steel sheets. Furthermore, around the core 20, a Y-connected winding 30 is wound.

Figure 2:
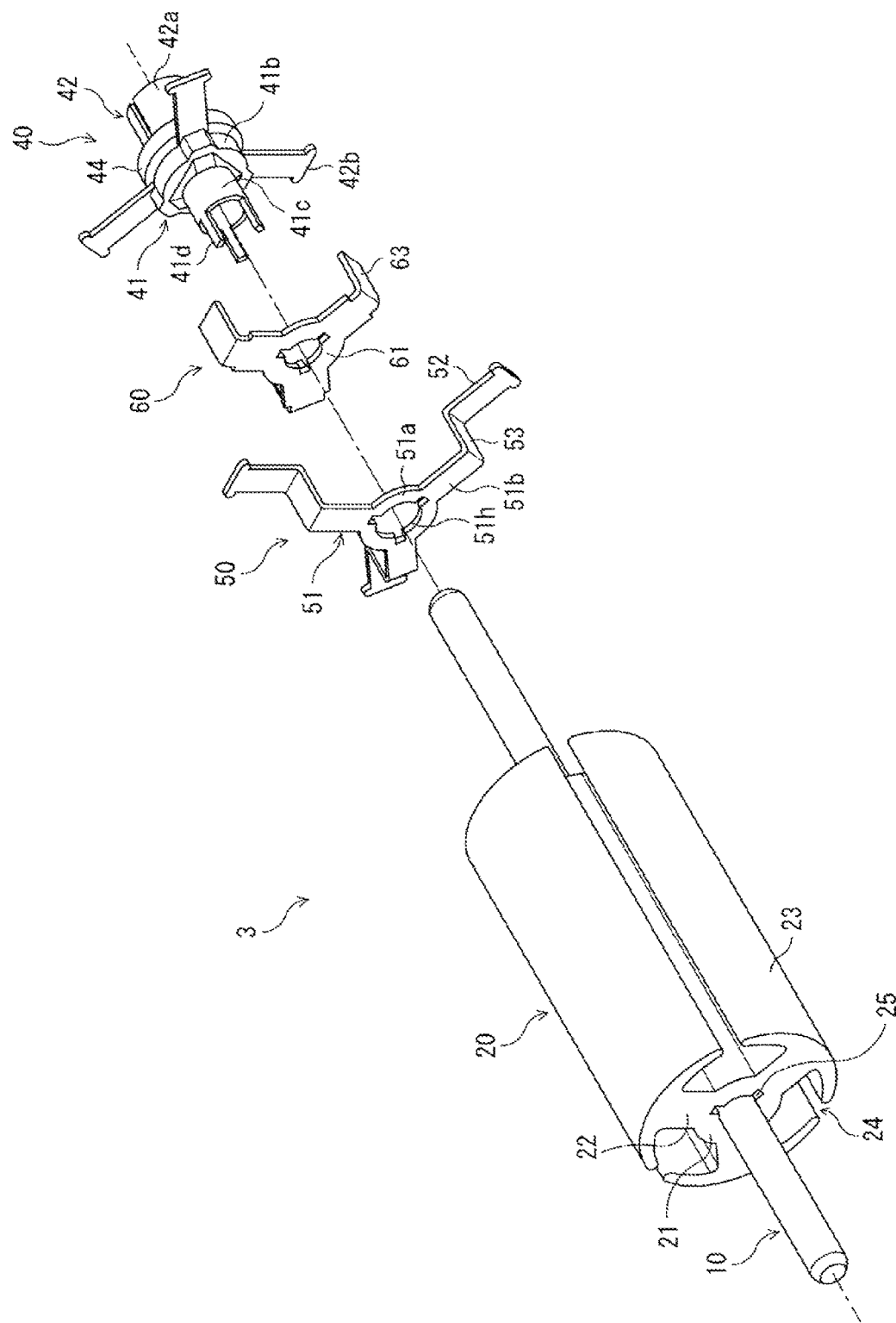
FIG. 2 is an exploded perspective view of a rotor according to the embodiment before the rotor is connected to a winding.
Figure 3A:
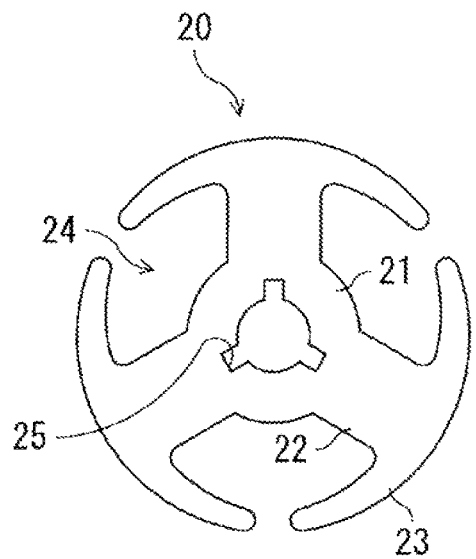
FIGS. 3A, 3B and 3C show components constituting the rotor shown in FIG. 2.

As shown in FIGS. 2 and 3A, the core 20 of the present embodiment has an external shape having threefold rotational symmetry. Specifically, the core 20 includes a center part 21 through which the shaft 10 is inserted and which has three key ways 25, three teeth 22 extended from the center part 21 radially outwardly, and three arcs 23 disposed at outer ends of the respective teeth 22 in such a manner that the arcs 23 are apart from each other circumferentially. Further, the core 20 has slots 24 each surrounded by corresponding ones of the arcs 23, which are disposed at tips of the respective teeth 22. The slots 24 are grooves extending in the axial direction of the core 20, and are provided at equal intervals along a circumference direction of the core 20 so that the number of slots 24 is three. Around each tooth 22 of the core 20, the winding 30 is wound by a predetermined number of turns through corresponding ones of the slots 24 located at both sides of the tooth 22. On portions of the core 20 on which the winding 30 is wound, an insulating layer (not illustrated) is coated. Thus, these portions are insulated.

Figure 4:
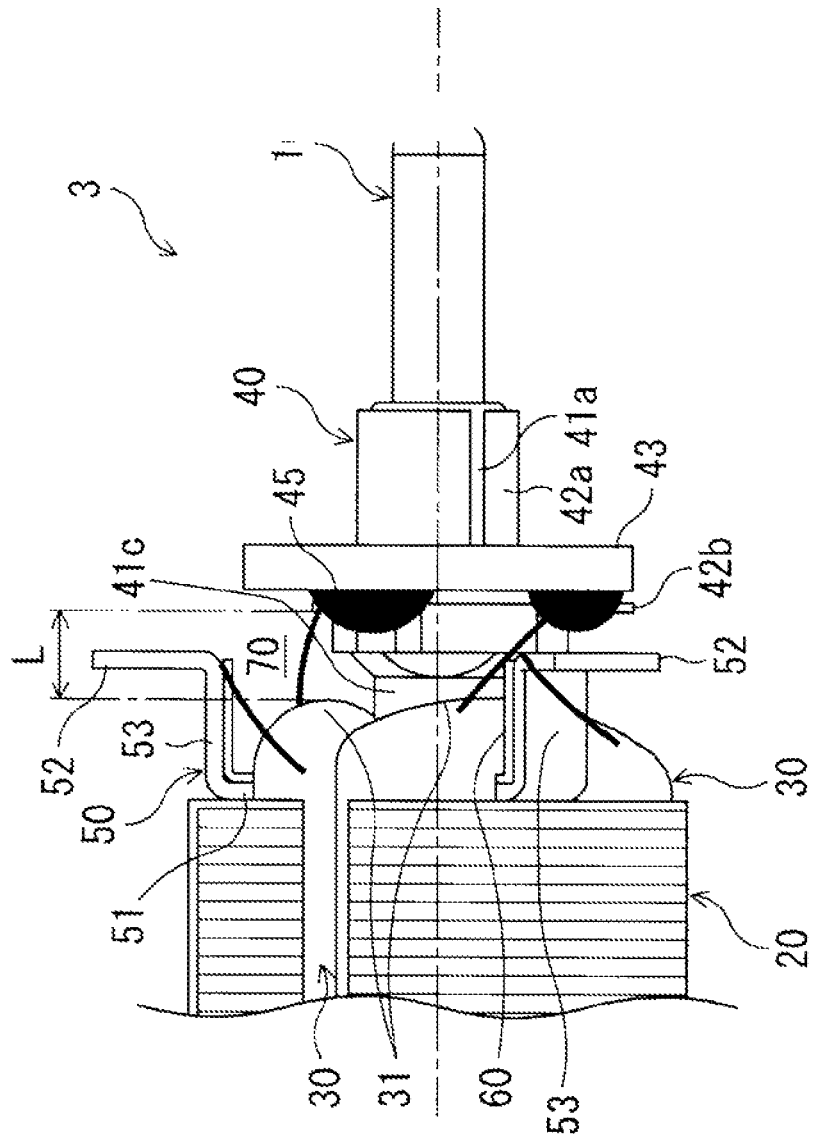
FIG. 4 is a side view of a part of the rotor according to the embodiment, showing a state after the rotor is connected to the winding but before the rotor is bonded to the conduction plate.

As shown in FIG. 4, the winding 30 is made of an insulated wire that generates a magnetic force when an electric current flows therethrough. The winding 30 wound around the teeth 22 of the core 20 has a connection made according to the Y-connection method. Namely, one end of the winding 30 is connected to corresponding one of three terminals 42b of the commutator 40 (described later). Thereafter, the winding 30 is wound around one of the three teeth 22 of the core 20, and the other end of the winding 30 is connected to one of three connection parts 52 of the conduction plate 50 (described later). Performing this process for the teeth 22, e.g., by a winding device forms the rotor 3 of the Y-connection method. The winding 30 wound around the core 20 has portions protruded from an end surface of the core 20 (i.e., portions bulged in a mountain shape). In the following description, such a portion of the winding 30 is called a winding projection 31.

Figure 3B:
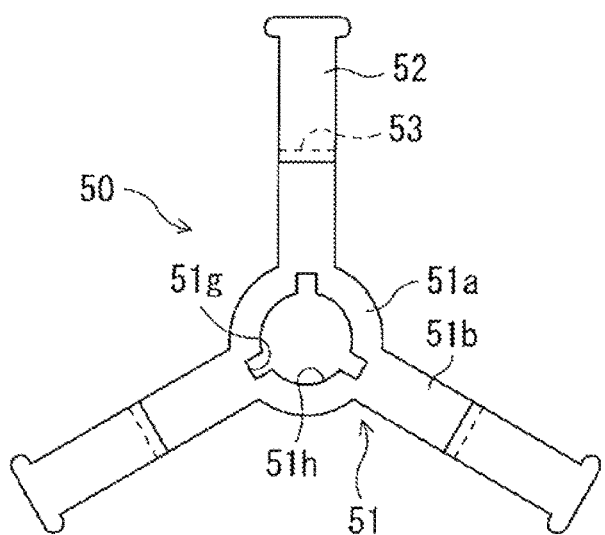
Figure 3C:
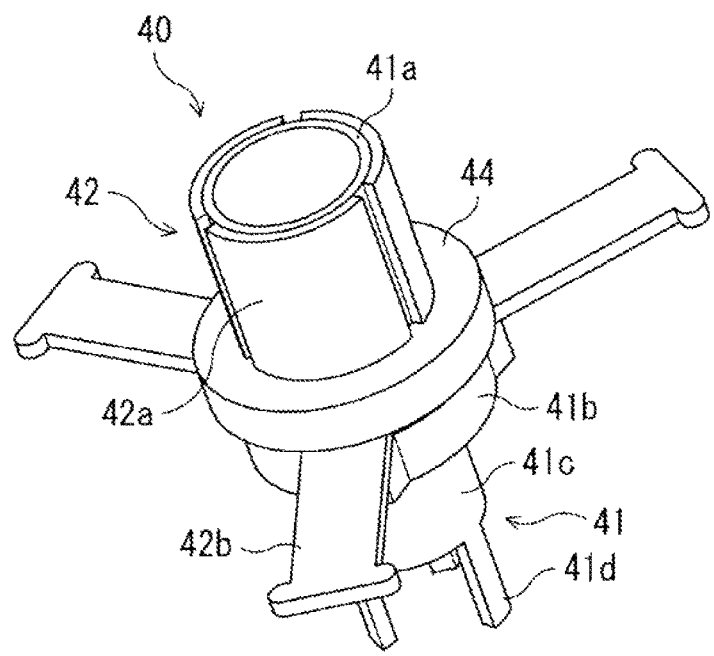

As shown in FIGS. 2 and 3C, the commutator 40 includes a support 41, which is an insulator part being fixed to the shaft 10, being made of a resin, and having a tubular shape. The commutator 40 also includes three commutator pieces 42 made of a metal. The support 41 includes a first tubular part 41a to which the commutator pieces 42 are fitted, an intermediate part 41b having a larger diameter than that of the first tubular part 41a, a second tubular part 41c disposed on an opposite side to the first tubular part 41a across the intermediate part 41b, and three legs 41d (insulator parts) projected from the second tubular part 41c in the axial direction. Around the second tubular part 41c, the winding projections 31 are disposed (see FIGS. 1 and 4). The legs 41d are projections projected from an annular end of the second tubular part 41c, and are disposed at equal intervals circumferentially. The legs 41d provide insulation between the conduction plate 50 and the shaft 10, and regulate a circumferential position of the conduction plate 50 with respect to the shaft 10.

The commutator pieces 42 each includes a brush contact part 42a configured to be in sliding contact with the brush 4B, and the terminal 42b to be connected to the winding 30. Each brush contact part 42a is shaped in one of three-divided parts of a tube, and has an inner surface configured to be in surface contact with an outer surface of the first tubular part 41a of the support 41. As a result of fitting an annular presser 44 to the commutator pieces 42 with the brush contact parts 42a in surface contact with the first tubular part 41a, the commutator pieces 42 are fixed to the support 41.

The terminals 42b are projected radially outwardly from arcuate ends of the respective brush contact parts 42a. Each terminal 42b is bonded to the winding 30 via thermal bonding (a bonding process using heat) such as welding or soldering after the winding 30 is fastened (hooked) to the terminal 42b. FIG. 4 shows, as an example, a state where the terminals 42b and the winding 30 are bonded to each other by soldering. Namely, black portions 45 in FIG. 4 are solder. As shown in FIG. 1, the commutator 40 of the present embodiment includes, on an outer periphery side of the presser 44, a varistor 43 configured to absorb a surge voltage, which may cause electrical noise.

Figure 5:
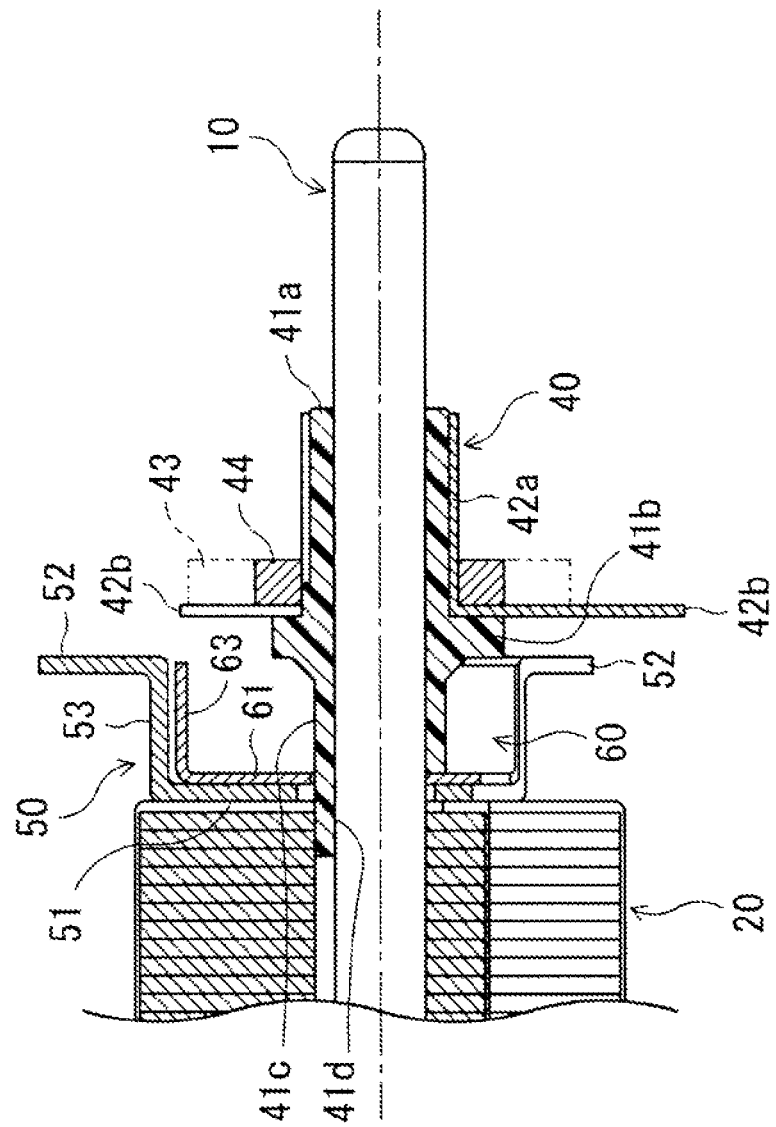
FIG. 5 is a cross-sectional view of the rotor shown in FIG. 4 viewed in the axial direction, showing a state before the rotor is connected to the winding.

The conduction plate 50 is a metallic plate in which an electrical neural point is to be formed. As shown in FIGS. 1 and 5, the conduction plate 50 is externally fitted onto the shaft 10 via the legs 41d of the commutator 40 between the terminals 42b of the commutator 40 and the core 20. The conduction plate 50 is disposed such that the connection parts 52 to be connected to the winding 30 are positioned closer to the end bell 4 than the winding projections 31 of the winding 30 wound around the core 20 and that the connection parts 52 are positioned closer to the core 20 than the terminals 42b. Namely, an axial direction position of the conduction plate 50 is set in an intermediate portion 70, which is between the winding projections 31 and the terminals 42b, so that the connection parts 52 are apart from both of the winding projections 31 and the terminals 42b. Consequently, interference between the connection parts 52 and the brush 4B is avoided, and heat generated during thermal bonding between the connection parts 52 and the winding 30 is difficult to be transmitted to the winding 30.

As shown in FIGS. 2 and 3B, the conduction plate 50 has an external shape having threefold rotational symmetry. Specifically, the conduction plate 50 has a plane 51 having, in a center thereof, a through-hole 51h through which the shaft is inserted. Further, the conduction plate 50 has the three connection parts 52 disposed more radially outwardly than the plane 51. The plane 51 is a part in which the electrical neural point is to be formed. The plane 51 has an annular part 51a through which the shaft 10 is inserted and three extensions 51b extended from the annular part 51a radially outwardly. The connection parts 52 are positioned on lines extended radially outwardly from the three extensions 51b, respectively. The through-hole 51h in the center of the annular part 51a has an inner diameter one size larger than an outer diameter of the shaft 10. Further, the through-hole 51h has recesses 51g to which the legs 41d of the support 41 of the commutator 40 are fastened respectively. This configuration allows the conduction plate 50 to be kept not in contact with the shaft 10, and allows the legs 41d to restrict the circumferential position of the conduction plate 50 with respect to the shaft 10. Note that the legs 41d are also fastened to the key ways 25 of the core 20.

As shown in FIGS. 2 to 5, according to the conduction plate 50 of the present embodiment, the plane 51 is placed on the end surface of the core 20 via the insulating layer. Specifically, according to the conduction plate 50, the extensions 51*b* are respectively placed on the teeth 22 of the core 20, and the winding 30 is wound around the plane 51 and the teeth 22. Further, the conduction plate 50 of the present embodiment has standing walls 53 respectively continued from the extensions 51*b* to the connection parts 52 of the plane 51. The standing walls 53, the extensions 51*b*, and the connection parts 52 are made of a single plate. The standing walls 53 are an element for defining an axial direction position of the connection parts 52, and are extended from radially-outward ends of the respective extensions 51*b* in a direction crossing the plane 51 (i.e., formed in a standing manner). Thanks to the standing walls 53, the positions of the connection parts 52 are determined merely by placing the plane 51 on the end surface of the core 20. This facilitates positioning of the conduction plate 50.

The connection parts 52 are respectively projected radially outwardly from ends (extended-direction ends) of the standing walls 53, the ends being opposite to ends of the standing walls 53 adjacent to the extensions 51*b*. The connection parts 52 of the present embodiment are projected outwardly from the respective standing walls 53 in such a manner that the connection parts 52 are orthogonal to the axial direction of the shaft 10, with the conduction plate 50 externally fitted onto the shaft 10. With this configuration, targeting to the connection parts 52 is easy in performing the thermal bonding between the winding 30 and the connection parts 52, so that workability in the bonding is improved. Furthermore, since the connection parts 52 are extended along the direction orthogonal to the axial direction, movement of welding electrodes during the bonding is necessary only in the direction orthogonal to the axial direction. Thus, control of production equipment is easy. Moreover, since the connection parts 52 are projected in the direction orthogonal to the axial direction of the shaft 10, distances between the connection parts 52 and the respective winding projections 31 are made longer. Consequently, heat generated in the bonding is more difficult to be transmitted to the winding 30.

The standing walls 53 of the present embodiment are provided in a standing manner as a result of being bent and then extended in a direction orthogonal to the plane 51, so as to be in parallel with the axial direction of the shaft 10. Consequently, the connection parts 52 are projected in a direction orthogonal to the standing walls 53. Since the standing walls 53 are extended in the direction orthogonal to the plane 51, respective lengths of the standing walls 53 necessary to position the connection parts 52 in a predetermined position are minimized.

The connection parts 52 are positioned in a center region in the intermediate portion 70, which is between the winding projections 31 and the terminals 42*b*, viewed in the axial direction. This is because such positioning involves an advantage that a longer distance between the connection parts 52 and the respective winding projections 31 reduces an influence of heat transmitted to the winding 30 and an advantage that a shorter distance between the connection parts 52 and the respective winding projections 31 makes it easier to perform the winding work of the winding 30. Namely, by setting an axial direction position of the connection parts 52 in the center region of the intermediate portion 70, the heat transmission during the bonding is reduced or suppressed, and good workability in winding the winding 30 around the core 20 is ensured. Note that the "center region" herein refers to a certain width including a center point of an axial direction length L of the intermediate portion 70, rather than the exact center point of the axial direction length L. Namely, for the conduction plate 50, a height (axial direction length) of the standing walls 53 is set so that the connection parts 52 are positioned in the center region where a distance between the connection parts 52 and the respective winding projections 31 is substantially equal to a distance between the connection parts 52 and the respective terminals 42*b*, with the plane 51 placed on the end surface of the core 20.

Namely, the connection parts 52 are disposed such that tips of the connection parts 52 are positioned more radially outwardly than an outer periphery of the core 20 and that the connection parts 52 are apart from the winding projections 31. Consequently, heat generated in the bonding is difficult to be transmitted to the winding 30. Further, the winding 30 can be wound only in a portion radially inside of the standing walls 53 of the conduction plate 50. For this, since the connection parts 52 are projected more radially outwardly than the outer periphery of the core 20, a radial position of the standing walls 53 is substantially equal to a position of the outer periphery of the core 20 relatively, so that a space (radial length) in which the winding 30 can be wound is increased. Namely, since a radial length of the extensions 51*b* of the plane 51 is substantially equal to a radial length of the teeth 22, a width (radial length) in which the winding 30 can be wound around the core 20 is not limited by the conduction plate 50.

Further, as shown in FIG. 1, the connection parts 52 may be positioned, in the space 2C between the end bell 4 and the end surface of the permanent magnet 2B facing the end bell 4, more outwardly than the end surface of the permanent magnet 2B (further away from the permanent magnet 2B) viewed in the axial direction. With this configuration, the connection parts 52 can be positioned more radially outwardly than an inner periphery of the permanent magnet 2B, so that heat generated in the bonding is more difficult to be transmitted to the winding 30.

Figure 6A:
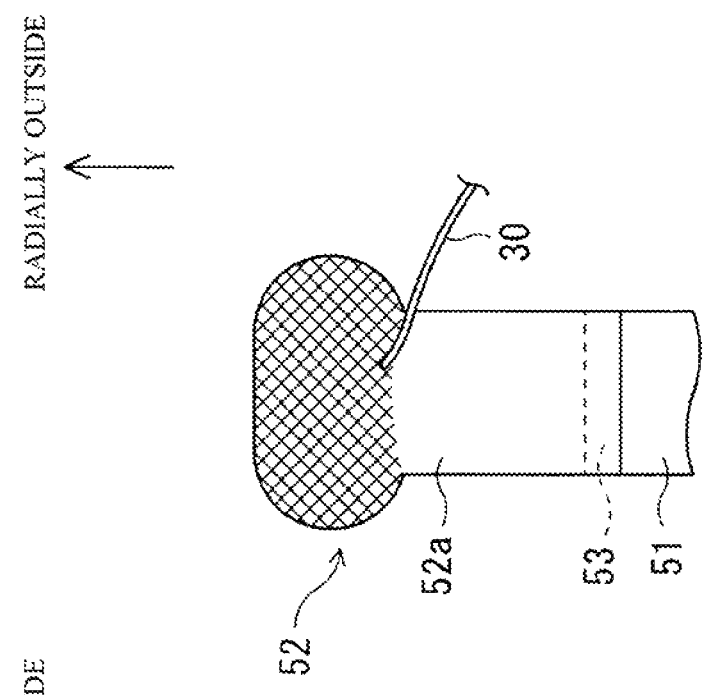
FIGS. 6A and 6B are an enlarged schematic view of a connection part of the conduction plate of the rotor shown in FIG. 2.
Figure 6B:
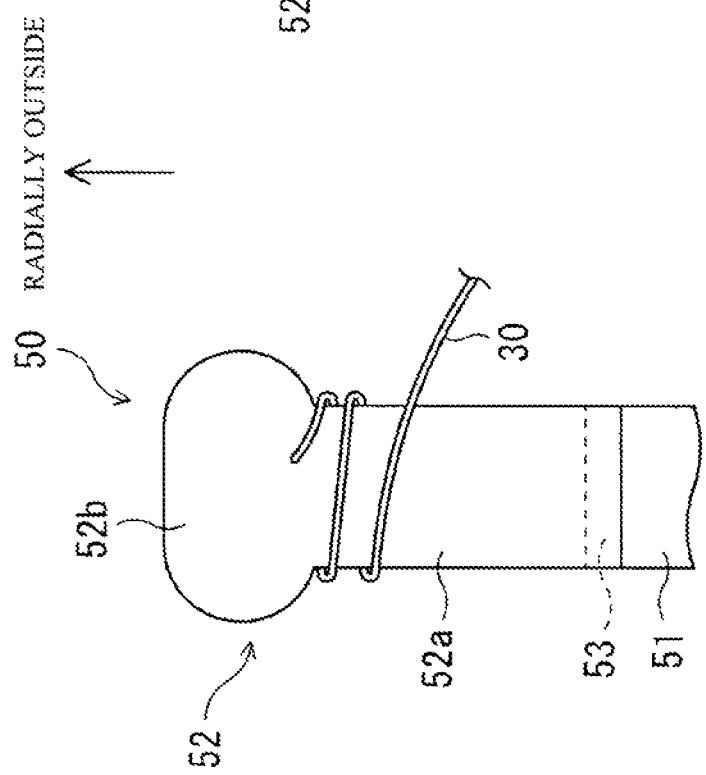

Now, taking as an example a case where connection between the winding 30 and the connection parts 52 is made by welding, the following describes a shape of each connection part 52. FIGS. 6A and 6B are enlarged schematic views of one of the connection parts 52. FIG. 6A shows the connection part 52 before welding, whereas FIG. 6B shows the connection part 52 after welding. FIGS. 6A and 6B each show the connection part 52 viewed in the axial direction (in a thickness direction of the connection part 52), and FIG. 6B has a mesh part, which indicates a welded portion. As shown in FIG. 6A, the connection part 52 has a base end part 52*a* on a base end side (radially inner side) and a wide part 52*b* on a tip side (radially outer side). The base end part 52*a* is extended radially outwardly with a constant width. The wide part 52*b*, provided at the tip side of the base end part 52*a*, is shaped in, e.g., an ellipse, an oval, a rectangle, or a triangle so as to have a larger width than that of the base end part 52*a*.

Around the tip side of the base end part 52*a*, the winding 30 wound around the core 20 is wound by a predetermined number of turns with a constant tension. This portion of the base end part 52*a* serves as a fastening portion at which the connection part 52 and the winding 30 are connected to each other with the tension of the winding 30 maintained, and also serves as a bonding portion to be molten together with the wide part 52*b* in welding so that the connection part 52 and the winding 30 are welded together.

As shown in FIG. 6B, as a result of welding together the connection part 52 and the winding 30, the winding 30 wound around the base end part 52*a* is molten and fixed with the wide part 52*b*, so that the winding 30 and the connection part 52 are electrically connected to each other. After the welding, a radial length of the connection parts 52 may change. However, both before and after the welding, the connection parts 52 are preferably projected more radially outwardly than the outer periphery of the core 20. As shown in FIG. 1, with the rotor 3 mounted for the stator 2, the connection parts 52 are positioned in the space 2C in the housing 2A. In this state, the connection parts 52 are not in contact with the inner surface of the housing 2A. In other words, the conduction plate 50 is shaped in such a manner that the conduction plate 50 is not in contact with the inner surface of the housing 2A, with the rotor 3 mounted for the stator 2 (i.e., after the welding).

According to the present embodiment, the winding 30 is wound around the conduction plate 50 and the core 20, and therefore the conduction plate 50 is insulated from the winding 30. Specifically, as shown in FIGS. 2, 4, and 5, an insulator 60 is disposed in contact with a surface of the conduction plate 50 facing a tip of the shaft (i.e., the surface being opposite to another surface of the conduction plate 50 facing the core 20). The insulator 60 is an insulator part having an external shape having threefold rotational symmetry. The insulator 60 of the present embodiment has an insulating plane 61 and insulating standing walls 63. The insulating plane 61 is placed on the surface of the plane 51 opposite to the surface onto which the insulating layer is provided. The insulating standing walls 63 are respectively extended along inner surfaces (surfaces facing radially inward) of the standing walls 53. The insulator 60 of the present embodiment is made of a material having a high heat resistance grade.

The insulating plane 61 has an annular part, which is one size larger than the annular part 51a of the plane 51 of the conduction plate 50 radially, and three extensions extended from the annular part radially outwardly. Further, each insulating standing wall 63 is shaped to be one size larger than each standing wall 53 of the conduction plate 50 in a circumferential direction. Furthermore, the insulating standing walls 63 are shaped to have an axial direction length substantially equal to a length from the plane 51 to the connection parts 52 of the conduction plate 50. This ensures insulation between the conduction plate 50 and the winding 30. Further, the insulating standing walls 63 are disposed in a standing manner between the connection parts 52 of the conduction plate 50 and the winding projections 31. With this, the heat transmission during the bonding is blocked by the insulator 60. In other words, the insulator 60 also serves as a heat insulating board.

2. Manufacturing Method of Rotor

With reference to FIG. 7, the following describes an embodiment of a manufacturing method of the above-described rotor 3. The present manufacturing method includes forming a conduction plate 50 (step S10), fitting components to a shaft 10 (step S20), winding of a winding 30 (step S30), and bonding both ends of the winding 30 (step S40). These four steps are performed in this order. These steps may be performed automatically by an apparatus, or may be performed manually. Note that the components of the rotor 3 (e.g., a shaft 10 and a core 20) except for the conduction plate 50 are prepared in advance.

In the forming, the conduction plate 50 is formed into the above-described final shape by pressing. Namely, the conduction plate 50 is formed to have a plane 51 in which an electrical neural point is to be formed, three standing walls 53 extended from a radially-outward end of the plane 51 in a direction crossing the plane 51, and connection parts 52 projected radially outwardly from ends of the respective standing walls 53. In this process, a height of the standing walls 53 is set so that the connection parts 52 are positioned closer to a tip of the shaft 10 than winding projections 31 of the winding 30 and closer to the core 20 than terminals 42b, with the plane 51 of the conduction plate 50 placed on an end surface of the core 20.

According to the present embodiment, the height of the standing walls 53 is set so that the connection parts 52 are positioned in a center region in an intermediate portion 70, which is between the winding projections 31 and the terminals 42b. Further, according to the present embodiment, the connection parts 52 of the conduction plate 50 are formed to be bent and extended in a direction orthogonal to an axial direction of the shaft 10 with the conduction plate 50 fitted to the shaft 10. Furthermore, the conduction plate 50 is formed so that the connection parts 52 are projected more radially outwardly than an outer periphery of the core 20 both before and after welding and that the connection parts 52 are not in contact with an inner surface of the housing 2A after welding.

In the fitting, the components such as the core 20, the conduction plate 50 formed as a result of the forming, an insulator 60, a commutator 40, and a varistor 43 are fitted to the shaft 10.

In the winding following the fitting, one end of the winding 30 is wound around one of the three terminals 42b of the commutator 40 and fastened thereto, and is then wound around one of three teeth 22 of the core 20 by a predetermined number of turns. In this process, due to the configuration in which the connection parts 52 of the conduction plate 50 are positioned in the center region of the intermediate portion 70, workability in winding the winding 30 around the core 20 is ensured.

In the winding, the other end of the winding 30 is wound around a corresponding one of the three connection parts 52 of the conduction plate 50 and fastened (hooked) thereto. In this process, the winding 30 is wound around a base end part 52a of the one of the connection parts 52 by some number of turns. This procedure for the winding is performed for three parts.

In the bonding, the one end and the other end of the winding 30 are respectively bonded to the one of the terminals 42b and the corresponding one of the connection parts 52 by thermal bonding such as welding or soldering. In this process, due to the configuration in which the connection parts 52 are positioned in the center region in the intermediate portion 70 and are projected more radially outwardly than the outer periphery of the core 20, heat generated in the bonding is difficult to be transmitted to the winding 30.

3. Effects (1) According to the above-described rotor 3, the connection parts 52 of the conduction plate 50 are positioned in the intermediate portion 70, which is between the winding projections 31 and the terminals 42b viewed in the axial direction. Namely, since the connection parts 52 are positioned closer to the end bell 4 than the winding projections 31 of the winding 30, the connection parts 52 are positioned apart from the winding projections 31. This suppresses or reduces heat transmission to the winding 30, the heat being generated in bonding by thermal bonding such welding or soldering. This avoids or reduces a thermal effect on the winding 30 during the bonding, so as to enhance reliability of the rotor 3.

Further, the connection parts 52 are disposed apart from the winding projections 31. This facilitates the work for fastening (hooking) of the winding 30 to the connection parts 52 and the work for bonding them, even for a rotor 3 having a small size (e.g., a rotor 3 having a diameter of less than 10 mm). This improves productivity of the rotor 3. Furthermore, since the connection parts 52 are positioned closer to the core 20 than the terminals 42b, the connection parts 52 do not come into contact with (interfere) the brush 4B. Namely, the above-described rotor 3 achieves higher reliability and workability while avoiding interference between the conduction plate 50 and the brush 4B, so as to achieve improved productivity.

(2) According to the above-described rotor 3, the connection parts 52 are positioned in the center region in the intermediate portion 70, which is between the winding projections 31 and the terminals 42b viewed in the axial direction. This suppresses or reduces the heat transmission during the bonding and improves the workability in the winding for the core 20.

(3) According to the above-described rotor 3, since the connection parts 52 are projected more radially outwardly than the outer periphery of the core 20, the connection parts 52 are positioned apart from the winding projections 31. This further reduces or suppresses the heat transmission to the winding 30.

(4) According to the above-described rotor 3, the conduction plate 50 has the standing walls 53 between the plane 51 and the connection parts 52. Thus, placing the plane 51 on the end surface of the core 20 leads to defining the positions of the connection parts 52 due to the standing walls 53. Namely, this configuration facilitates positioning of the connection parts 52, so as to enhance the productivity of the rotor 3. For the above-described conduction plate 50 having the standing walls 53, the winding 30 is wound also around the plane 51. Regarding this, due to the configuration in which the connection parts 52 are projected more radially outwardly than the outer periphery of the core 20, a width (radial length) in which the winding 30 can be wound around the core 20 is increased. In other words, with this configuration, a space in which the winding 30 can be wound is not limited by the conduction plate 50, and the core 20 can be effectively used.

(5) According to the above-described rotor 3, the connection parts 52 are projected outwardly from the respective standing walls 53 so as to be orthogonal to the axial direction of the shaft 10, with the conduction plate 50 fitted to the shaft 10. This further enhances the workability in the thermal bonding such as welding or soldering. Further, this makes the tips of the connection parts 52 furthest away from the winding 30 wound around the core 20, viewed in the circumferential direction. This further reduces or suppresses the heat transmission to the winding 30 during the bonding, so as to enhance a protection performance for the winding 30.

(6) The above-described rotor 3 includes the insulator 60 placed on the surface of the plane 51 of the conduction plate 50, the surface being opposite to another surface of the plane 51 facing the insulating layer. The insulator 60 is extended along the inner surfaces (surfaces facing the radially inside) of the standing walls 53. This avoids contact between the conduction plate 50 and the winding 30, so as to avoid a short-circuit therebetween. Further, since the insulator 60 is extended along the inner surfaces of the standing walls 53, the insulator 60 is disposed in a standing manner between the connection parts 52 and the winding projections 31. With this, the insulator 60 also serves as a heat insulating board for blocking transmission of heat to the winding 30, the heat being applied to the conduction plate 50 in the bonding. This further enhances the protection performance for the winding 30. The insulator 60 may be formed of a material having a high heat resistance grade. This avoids deformation and melting of the insulator 60, so as to maintain the insulating and heat-blocking performances appropriately.

(7) The above-described motor 1, which includes the rotor 3 configured as above, achieves higher product quality and productivity, independently of the size of the motor.

(8) The above-described rotor 3 is manufactured as follows. That is, a conduction plate 50 is formed into a shape having a plane 51, connection parts 52, and standing walls 53. After that, the conduction plate 50 is fitted to a shaft 10, a winding 30 is wound around the conduction plate 50, and the winding 30 and the conduction plate 50 are bonded to each other. Namely, since this method forms the conduction plate 50 into the final shape before connection of the winding 30 to the connection parts 52, a tension of the winding 30 is kept more suitably and the protection performance for the winding 30 is enhanced, as compared with a manufacturing method of a rotor 3 by bending a conduction plate after connection of a winding 30 to connection parts 52.

If the purpose is merely to position the connection parts 52 of the conduction plate 50 away from the winding 30 (winding projections 31), the above-described standing walls 53 seem to be unnecessary, and it seems to be enough to bond a winding 30 to connection parts having extensions 51b of a simple shape merely extended radially outwardly and then to bend the connection parts so that they can be accommodated in the housing 2A (i.e., "post-bending"). However, according to this method, since the ends of the winding 30 are already connected to the connection parts, bending such connection parts may result in an excess tension on the winding 30 and/or breakage of the winding 30. On the other hand, according to the above-described manufacturing method of the rotor 3, such "post-bending" is not performed. Therefore, the protection performance for the winding 30 is enhanced, so that the reliability of the rotor 3 is enhanced, as described above.

4. Others

The configurations of the motor 1 described in the above embodiments are presented as examples, and the motor 1 of the present disclosure is not limited to those described above. Namely, the shapes and configurations of the stator 2, the rotor 3, and the end bell 4 are not limited to those described above. Further, the shape and position of the conduction plate 50 may be changed from those described above. For example, the connection parts 52 of the conduction plate 50 may not be positioned in the center region in the intermediate portion 70, which is between the winding projections 31 and the terminals 42b, viewed in the axial direction. Alternatively, a connection part 52 of a conduction plate 50 may be positioned closer to a winding projection 31 or a terminal 42b.

Alternatively, a standing wall 53 of a conduction plate 50 may be formed to be bent at an obtuse angle with respect to a plane 51. Also in this configuration, a connection part 52 is preferably projected outwardly from the standing wall 53 in a direction orthogonal to an axial direction of a shaft 10. Namely, the standing wall 53 and the connection part 52 may not be orthogonal to each other. Further alternatively, a connection part 52 may be projected in a direction not orthogonal to an axial direction of a shaft 10. For example, a connection part 52 may be projected obliquely outwardly toward a tip of a shaft 10 (toward an end bell 4) relative to an axial direction of the shaft 10. This allows a tip of a connection part 52 to be positioned further away from a winding 30, so as to reduce the thermal effect.

Alternatively, a connection part 52 of a conduction plate 50 may not have a wide part 52b, and may have, to its tip, a constant width that is equal to a width of a base end part 52a. Further, when bonding between a connection part 52 and a winding 30 is to be made by soldering, the winding 30 may be wound with a constant tension, and the winding 30 may not be wound loosely.

Alternatively, a conduction plate 50 may not have a standing wall 53. Namely, the conduction plate 50 may be a conduction plate configured such that a connection part 52 and a plane 51 exist on an identical plane. In this configuration, positioning of the conduction plate relative to a shaft 10 may be set such that the connection part 52 is positioned in an intermediate portion 70, which is between a winding projection 31 and a terminal 42b, and the conduction plate may be externally fitted onto the shaft 10 via an insulator. Namely, in this configuration, the conduction plate may be positioned such that the connection part 52 is positioned in a certain position, without placing the conduction plate on an end surface of a core 20. Even with a rotor 3 having such a configuration, higher reliability and workability are achieved while interference between the conduction plate and a brush 4B is avoided, as with the rotor having the above-described configuration. This leads to improvement in productivity of the rotor 3.

According to the above-described manufacturing method, the bonding is performed after the winding. Alternatively, the bonding and the winding may be performed in parallel. Namely, a rotor 3 may be manufactured by fastening one end of a winding 30 to a terminal 42b and bonding them via thermal bonding, followed by winding the winding 30 around a core 20 and fastening and bonding of the other end of the winding 30.

Alternatively, a conduction plate 50 and an insulator 60 may be positioned on an opposite side to a commutator 40 across a core 20. This eliminates the possibility of interference between a connection part 52 and a commutator 40, so as to improve flexibility in positioning of the connection part 52. Further alternatively, a conduction plate 50, an insulator 60, and a commutator 40 may be integrally formed by insert molding. In this case, the insulator 60, a support 41, and a presser 44 are formed as an integrated resin component. This enhances workability in assembling.

In the above-described embodiments, the core 20 of the rotor 3, the conduction plate 50, and the insulator 60 shown as an example have an external shape having threefold rotational symmetry. However, the core 20 of the rotor 3, the conduction plate 50, and the insulator 60 are not limited to the above-described shapes, and it is only necessary for the core 20 of the rotor 3, the conduction plate 50, and the insulator 60 to have an external shape having threefold or more rotational symmetry. Further, the connection method for the winding 30 is not limited to the Y-connection.

What is claimed is:

1. A rotor comprising:
a core around which a winding is wound, the core being rotatable integrally with a shaft;
a commutator being fixed to the shaft and having a terminal to be connected to one end of the winding; and
a conduction plate being externally fitted onto the shaft via an insulator part between the terminal of the commutator and the core, the conduction plate having:
at least one connection part to be connected to the other end of the winding; and
a plane which is placed on a radially-inner side of the at least one connection part and in which an electrical neural point being to be formed, wherein
an axial direction position of the at least one connection part is set in an intermediate portion that is between a winding projection of the winding and the terminal, and
the plane and one of the at least one connection part are disposed at positions different from each other in an axial direction of the rotor.

2. The rotor according to claim 1, wherein the at least one connection part is spaced apart from each of the winding projection and the terminal in the axial direction position of the rotor.

3. The rotor according to claim 1, wherein the at least one connection part is projected more radially outwardly than an outer periphery of the core.

4. The rotor according to claim 1,
wherein the at least one connection part includes a plurality of connection parts, and
wherein the conduction plate includes:
the plane being placed on an end surface of the core via an insulating layer;
a plurality of standing walls extended from a radially-outward end of the plane in a direction crossing the plane, the plurality of standing walls defining an axial direction position of the plurality of connection parts; and
the plurality of connection parts being radially outwardly projected from extended-direction ends of the respective plurality of standing walls.

5. The rotor according to claim 4, wherein the plurality of connection parts are projected outwardly from the respective plurality of standing walls in such a manner that the plurality of connection parts are orthogonal to an axial direction of the shaft with the conduction plate externally fitted onto the shaft.

6. The rotor according to claim 4, further comprising:
an insulator placed on a surface of the plane, the surface being opposite to another surface of the plane facing the insulating layer, the insulator being extended along inner surfaces of the plurality of standing walls.

7. A direct current motor comprising:
the rotor according to claim 1;
a stator including a housing having a bottomed tubular shape and a permanent magnet fixed onto an inner surface of the housing, the stator rotatably supporting an end of the shaft of the rotor; and
an end bell fixed to an opened part of the housing, the end bell including a brush.

8. A manufacturing method of a rotor that includes a core and a commutator each rotatable integrally with a shaft and a conduction plate externally fitted onto the shaft via an insulator part between the core and a terminal of the commutator, the method comprising:
forming the conduction plate including a plane in which an electrical neural point is to be formed, a plurality of standing walls extended from a radially-outward end of the plane in a direction crossing the plane, and connection parts being projected radially outwardly from ends of the respective plurality of standing walls;
after the forming, fitting the core, the conduction plate, and the commutator to the shaft;
after the fitting, winding by fastening one end of a winding to the terminal of the commutator, followed by winding the winding around the core and fastening the other end of the winding to one of the connection parts of the conduction plate; and in parallel with or after the winding, bonding the one end and the other end of the winding to the terminal and the one of the connection parts, respectively, by thermal bonding, wherein the forming causes the conduction plate to be formed such that, with the plane of the conduction plate placed on an end surface of the core by the fitting, an axial direction position of the connection parts is set in an intermediate portion that is between a winding projection of the winding and the terminal.

9. A rotor comprising:

a core around which a winding is wound, the core being rotatable integrally with a shaft;

a commutator being fixed to the shaft and having a terminal to be connected to one end of the winding; and a conduction plate being externally fitted onto the shaft via an insulator part between the terminal of the commutator and the core, the conduction plate having:
  at least one connection part to be connected to the other end of the winding; and
  a plane which is placed on a radially-inner side of the at least one connection part and in which an electrical neural point being to be formed, the plane and an entire portion of the at least one connection part being made of same material, wherein an axial direction position of the at least one connection part is set in an intermediate portion that is between a winding projection of the winding and the terminal, and the plane and one of the at least one connection part are disposed at positions different from each other in an axial direction of the rotor.

* * * * *